United States Patent [19]
Reh et al.

[11] Patent Number: 5,076,524
[45] Date of Patent: Dec. 31, 1991

[54] TV/LCD POP-UP STOWAGE RETRACTION MEANS

[75] Inventors: Carter K. Reh, Santa Ana; Edward Robak, Orange, both of Calif.

[73] Assignee: Sony Trans Com, Inc., Irvine, Calif.

[21] Appl. No.: 635,691

[22] Filed: Dec. 27, 1990

[51] Int. Cl.$^5$ .............................................. E04G 3/00
[52] U.S. Cl. .................................. 248/296; 248/278; 297/194
[58] Field of Search ........................ 297/144, 188, 194; 248/274, 278, 279, 281.1, 282, 283, 285, 286, 287, 289, 291, 293, 296, 297.2, 295.1, 472, 685

[56] References Cited

U.S. PATENT DOCUMENTS

| | | | |
|---|---|---|---|
| 4,756,572 | 7/1988 | Dykstra et al. | 297/145 X |
| 4,907,775 | 3/1990 | Lorence et al. | 297/194 X |
| 5,007,610 | 4/1991 | Christiansen et al. | 248/293 |
| 5,022,617 | 6/1991 | Henderson | 248/293 |

Primary Examiner—Ramon O. Ramirez
Attorney, Agent, or Firm—Blakely Sokoloff Taylor & Zafman

[57] ABSTRACT

An armrest that has a plurality of telescopic trays that collapse to allow a viewing device to be retracted from a stowing compartment within the armrest. The telescopic trays can then be rolled back while the viewing device is displayed, allowing the passenger to utilize both the monitor and the trays. The viewing device is connected to a slide plate that slides along a track that is mounted within the stowing compartment. The plate and track allow the monitor to be retracted from the compartment. The viewing device is also attached to a pair of joints, such that the device can be rotated about the x, y and z axis, to allow the passenger to display and move the monitor into the most comfortable position.

11 Claims, 4 Drawing Sheets

TV/LCD POP-UP STOWAGE RETRACTION MEANS

BACKGROUND OF THE INVENTION

1. Field of the Invention

This invention relates to armrest storage compartments typically used in commercial aircraft, which have the additional feature of having a tray for drinks, food etc.

2. Description of the Related Art

As airplanes increasingly become the mode of travel, airlines are constantly improving passenger comfort and convenience. The development of "Liquid Crystal Display" (LCD) screens, which are both thin and light, will allow the industry to provide each individual with their own screen. Because of safety requirements and customer convenience, the screen must be easily stored and retracted. What is preferred, is a design wherein the screen is stored in the armrest of the seat. Some seats, particularly in first class, have trays on the upper surface of the armrest that hold food, drinks etc. To maximize passenger comfort, it is desirable to provide an armrest, where the viewer can watch the screen while still being able to rest their food or drinks on the tray.

SUMMARY OF THE INVENTION

Therefore it is an object of this invention to provide an armrest that can display a viewing device stored within the armrest, while providing a tray to support items of the passenger.

This invention is an armrest that has a plurality of telescopic trays that collapse to allow a viewing device to be retracted from a stowing compartment within the armrest. The telescopic trays can then be rolled back while the viewing device is displayed, allowing the passenger to utilize both the monitor and the trays. The viewing device is connected to a slide plate that slides along a track that is mounted within the stowing compartment. The plate and track allow the monitor to be retracted from the compartment. The viewing device is also attached to a pair of joints, such that the device can be rotated about the x, y and z axis, to allow the passenger to display and move the monitor into the most comfortable position.

BRIEF DESCRIPTION OF THE DRAWINGS

The objects and advantages of this invention will become more readily apparent to those skilled in the art after reviewing the following detailed description and accompanying drawings, wherein.

DETAILED DESCRIPTION OF THE INVENTION

Figure 1:
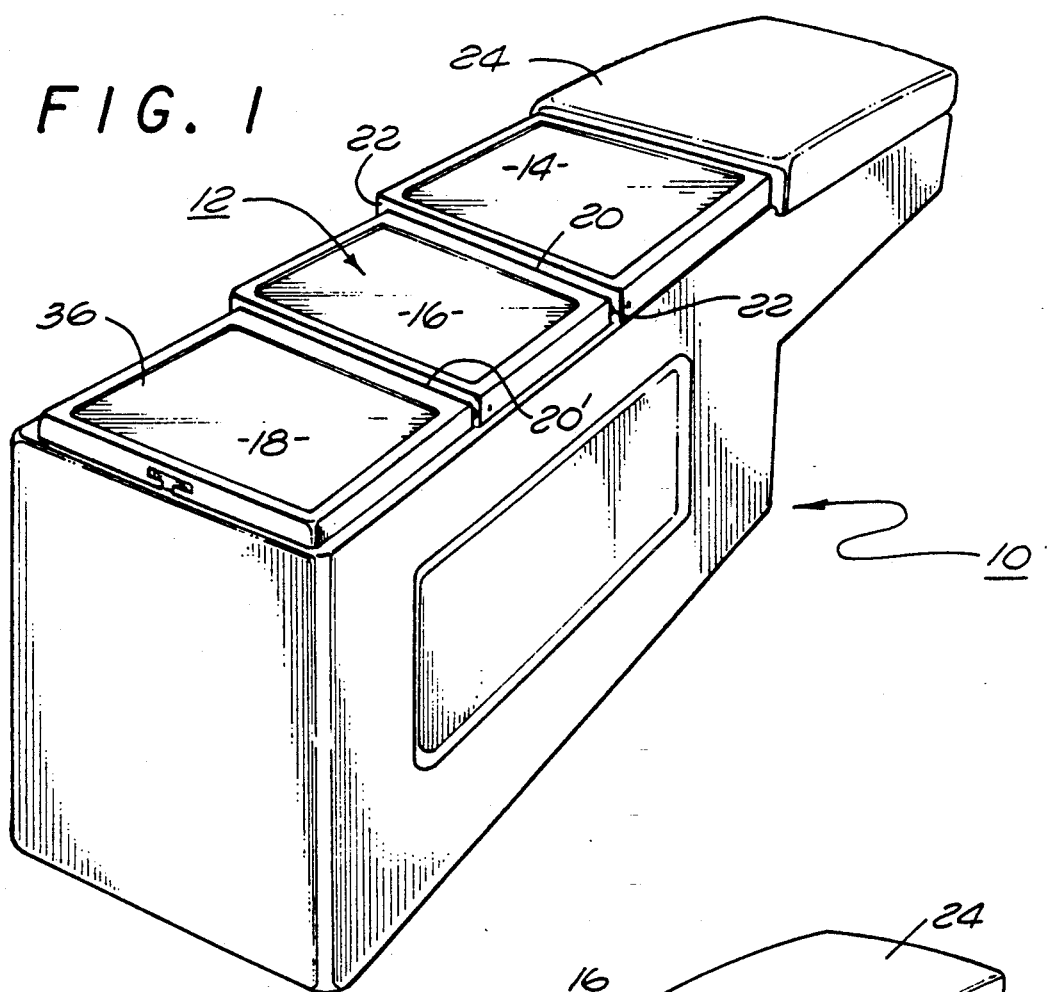
FIG. 1 is a perspective view of an armrest with a telescopic tray cover.
Figure 2:
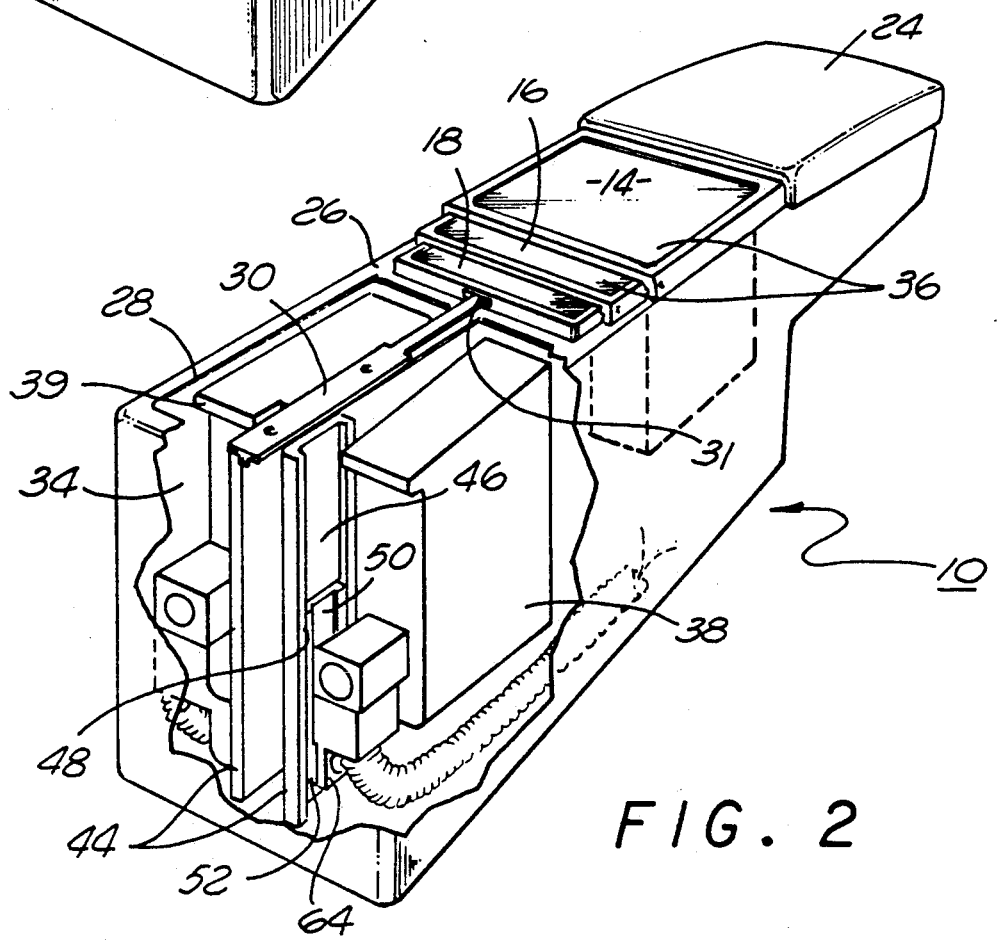
FIG. 2 is a perspective view similar to FIG. 1, showing a viewing device stored in a stowing compartment of the armrest.
Figure 1A:
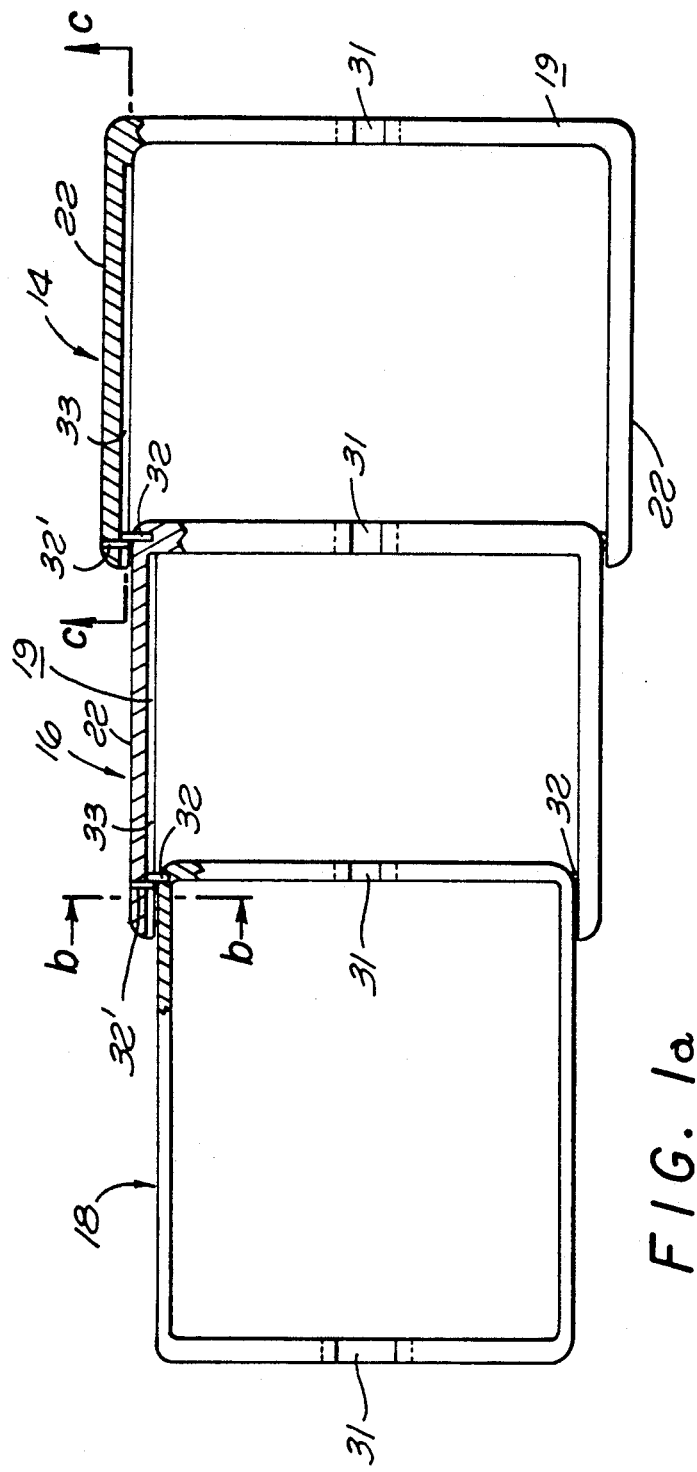
FIG. 1a is a top view of the telescopic trays of FIG. 1, showing pins attached to the trays to limit the relative movement of the trays therein.
Figure 1C:
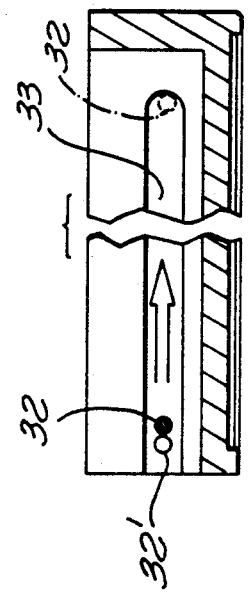
FIG. 1c is a side view of FIG. 1, taken at line 1c—1c, showing the movement of the pins within a slot incorporated into a tray.
Figure 1B:
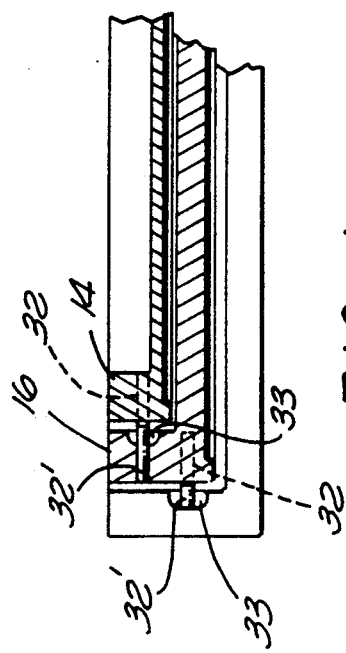
FIG. 1b is a side view of FIG. 1 taken at line 1b—1b, showing the relative locations of the pins at each tray.

Referring to the drawings more particularly by reference numbers, number 10 is an armrest 10, typically installed in a commercial airplane. The armrest 10 has a telescopic tray cover 12, that can be used by passengers to support drinks, food etc. In the preferred embodiment the telescopic tray 12 has a first tray 14, a second tray 16, and a third tray 18. As shown in FIG. 1a the first tray 14 has a wall 19 that extends around the periphery of the tray such that the cross section of the tray is a C-channel 20, wherein the distance between the side walls 22 of the C-channel is greater than the width of the second tray 16, such that the second tray 16 can slide underneath the first tray 14. Likewise, the second tray 16 has a C-channel 20' with predetermined dimensions, such that the third tray 18 can slide underneath the second tray 16. The third tray 18 has a wall 19 that extends all the way around the tray. The armrest 10 may also have a cushion 24 rigidly attached to the armrest 10, to provide additional passenger comfort. As shown in FIG. 2, the trays slide along the upper surface 26 of a stowing cabinet 28 and are guided by a first guide rail 30, which fits within a channel 31 in the third tray 18. The first 14 and second 16 trays may also have channels 31 in the walls 19 as shown in FIG. 1a, adapted to fit within the guide rail 30 such that the rail 30 limits lateral movement of the trays. The guide rail 30 may have a wide portion that abuts the wall 19 extending from the back of the third tray 18, when the third tray 18 is moved into the most forward position. The channel 31 in the front of the third tray 18 being wider to allow the third tray 18 to slide over the wider portion of the guide rail 30. This arrangement prevents the third tray 18 from sliding off the stowing cabinet 28. The guide rail 30 may be screw mounted to the stowing cabinet 28 such that the rail and trays are one unit. When the trays are in a closed position, as shown in FIG. 1, a part of the second tray 16 can be under the first tray 14, and the second tray 16 can overlap a portion of the third tray 18. As shown in FIGS. 1a–1c, the third 18 and second 16 trays may have first pins 32 that slide along grooves 33 within the second 16 and first 14 trays, respectively. The pins 32 and grooves 33 provide means for the trays to slide relative to each other in an essentially parallel fashion. The first 14 and second 16 trays may have second pins 32' at one end of the grooves 33 that abut said corresponding first pins 32 to limit the movement of the third 18 and second 16 trays as shown in FIG. 1a. The trays are thus constructed such that the telescopic tray 12 may operate to expose a stowing compartment 34 from either the front or the rear. The trays can also move independently of each other, so that the second tray 16 can slide over the third tray 18, without moving the first tray 14. Thus a stowing compartment 34 that extends the length of the armrest 10 can be incorporated, wherein a stored object is easily and independently accessible from every position, from the forward or rear areas within the compartment 34. The trays may have recessed areas 36 to facilitate support of the food, drinks etc.

Figure 3:
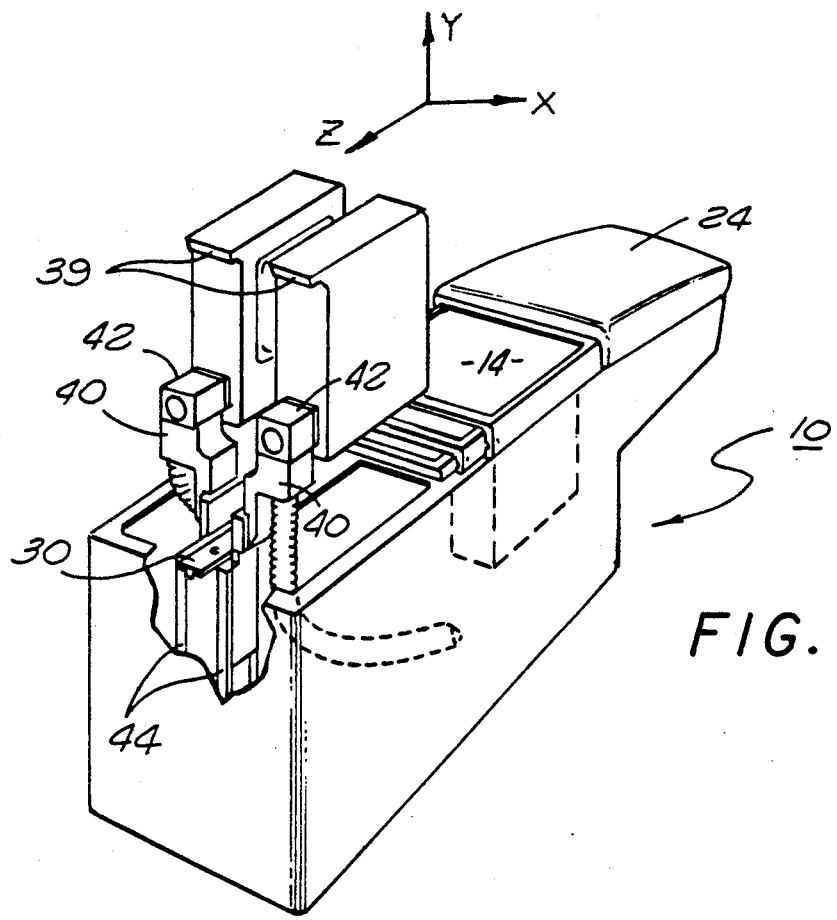
FIG. 3 is a perspective view similar to FIG. 2, showing the viewing device retracted out of the stowing compartment.
Figure 4:
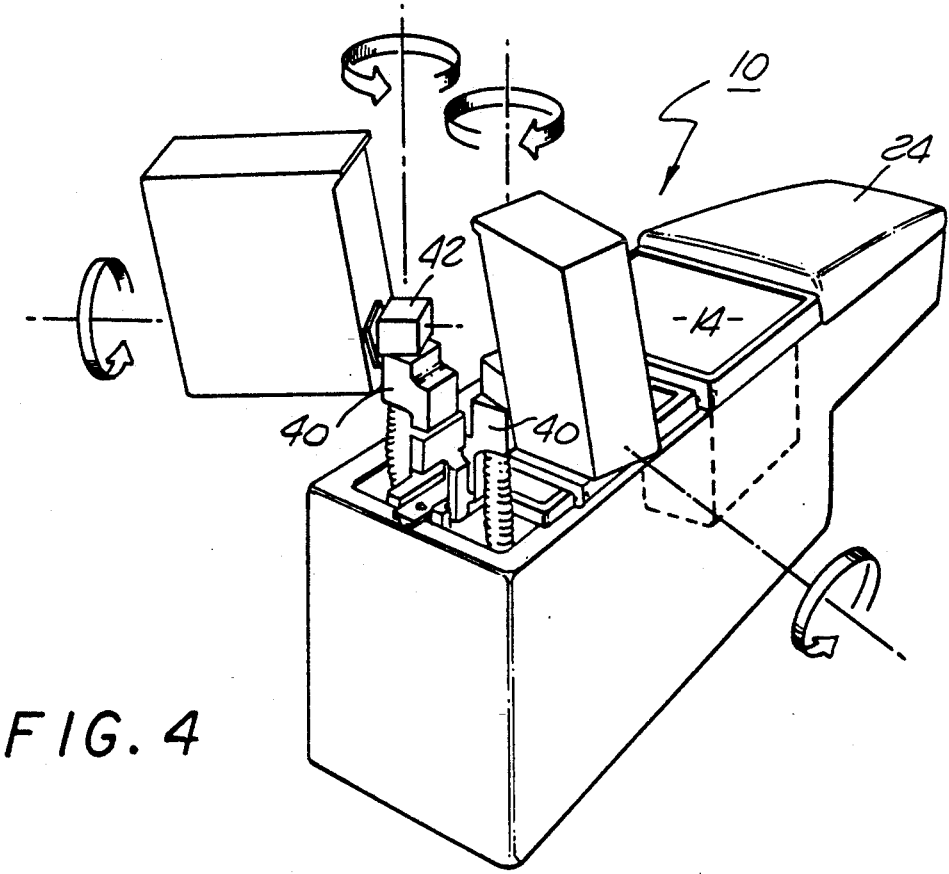
FIG. 4 is a perspective view similar to FIG. 3 showing the viewing device rotated into a "viewing" position.

The stowing cabinet 28 can hold viewing screens 38 such as television or computer monitors, wherein the monitors utilize "Liquid Crystal Display" (LCD) technology which allows the viewing screens to be thin and light. FIG. 2 shows a preferred embodiment of storing the viewing screens 38 within the stowing compartment 34. The monitors 38 may have hold tabs 39, which allows a passenger to grab the monitor 38 and pull the screens out of the stowing compartment 34 along a y axis, as shown in FIG. 3. FIG. 4 shows how the screens 38 can then be rotated about the y axis by a first joint 40 and about the z axis by a second joint 42, such that the passengers can orient the screens 38 accordingly.

Figure 5:
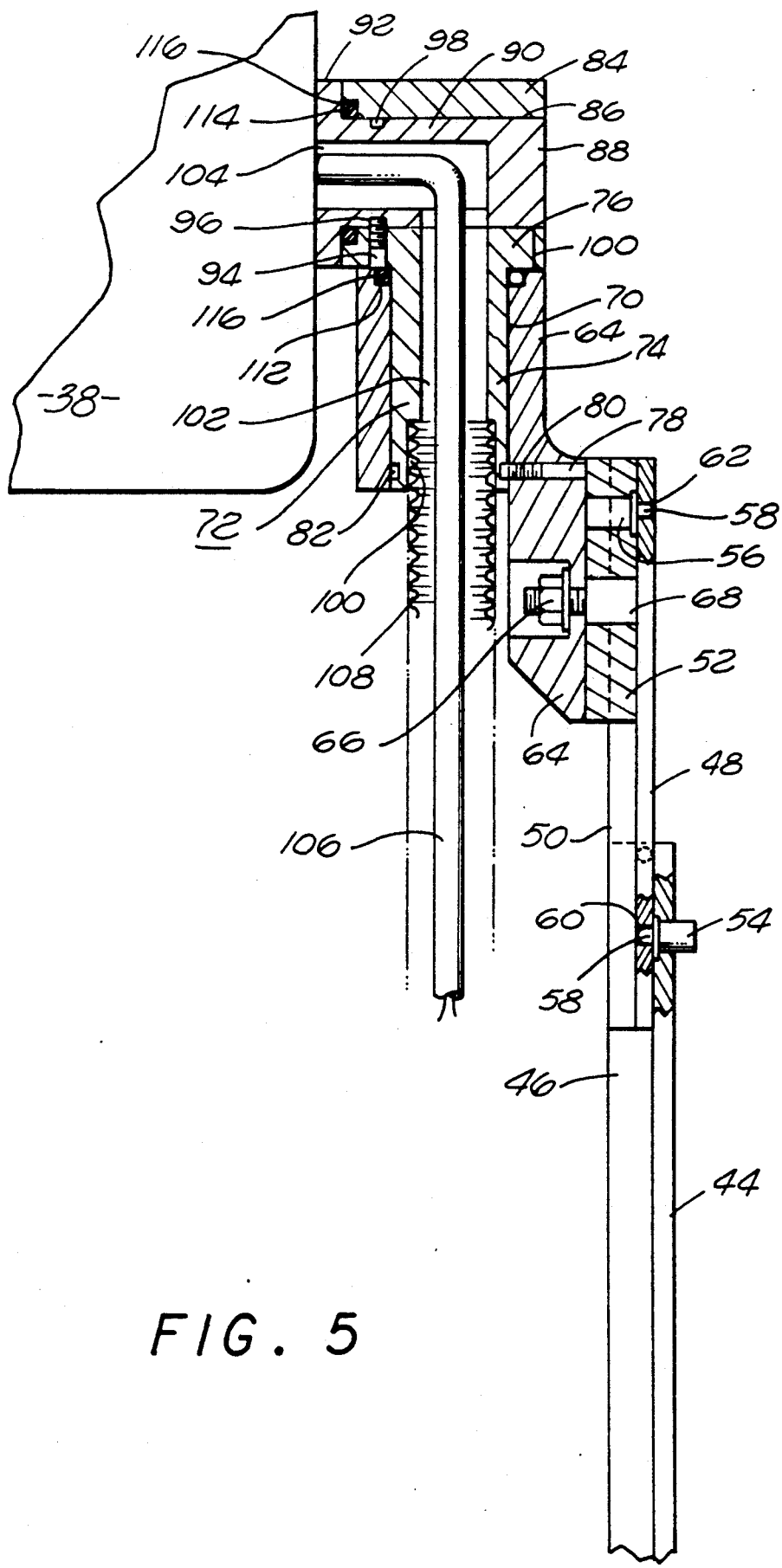
FIG. 5 is a cross-sectional view, showing the "pop-up" mechanism of the viewing device.

FIGS. 2 and 5 more accurately show the preferred embodiment for retracting the monitors 38 from the stowing compartment 34. Track 44 is mounted within the compartment 34 extending up to the upper surface 26. Each track 44 has a first groove 46 along the longitudinal axis that is adapted to allow first slide plate 48 to slide along the first groove 46. The first slide plate 48 has a second groove 50 along the longitudinal axis adapted to allow second slide plate 52 to slide within the second groove 50. The track 44 and second slide plate 52 have first 54 and second 56 spring loaded detents that push dowels 58 into first 60 and second 62 apertures, respectively, when the apertures align with the detents. In operation, when the monitor 38 is pulled up, the second slide plate 52 slides along the second grove 50 until the second aperture 62 aligns with the second detent 56, wherein the second detent 56 snaps the dowel 58 into the aperture 62, securing the second slide plate 52 to the first slide plate 48. The first slide plate 48 then slides along the first groove 46 of the track 44 until the first aperture 60 aligns with the first detent 54, wherein the detent 54 pushes the dowel 58 into the first aperture 60, securing the first slide plate 48 to the track 44. The dowels 58 should have a length and radius such that the dowels 58 disengage from the apertures when a small force is applied to the monitors 38. This allows the passengers to easily detach the slide plates and push the screens 38 back into the stowing department 34.

A first housing 64 is mounted to the second slide plate 54 by a screw 66 that threads into a jam-nut 68 pressed into the second plate 54. The jam-nut 68 is pressed into the second slide plate 54 with a predetermined force, such that a corresponding force applied to the screen 38 will pull the nut 68 out of the plate 52 and separate the screen 38 from the armrest 10. This feature allows the display to meet safety requirements, that all protruding equipment must be capable of being pushed away, in the event the passenger is subjected to conditions such as turbulent weather. The first housing 64 has a first bore 70 along the longitudinal axis. Within the first bore 70 is a first bearing 72 having a cylindrical shank 74 within the first housing 64 and a first flange 76 extending from the first housing 64. The first housing 64 has a first threaded aperture 78 that receives a first set screw 80. The first set screw 80 extends into a first groove 82 that goes around the periphery of the bearing shank 74. The first screw 80 holds the first bearing 72 within the first housing 64, while allowing the bearing 72 to rotate about the y axis of the first housing 64. On top of the first housing 64 is a second housing 84 having a second bore 86. Within the second bore 86 is a second bearing 88 having a shank 90 within the second housing 84 and a second flange 92 extending from the second housing 84 and attached to the monitor 38. The first flange 76 of the first bearing 72 has a second threaded aperture 94 that receives a second set screw 96. The second set screw 96 extends into a second groove 98 that goes around the periphery of the bearing shank 90. The second set screw 96 insures that the second bearing 88 does not fall out of the second housing 84 while allowing the second bearing 88 to rotate relative to the second housing 84. The second housing 84 also has a third bore 100 that receives the first flange 76 of the first bearing 72. The flange 76 and third bore 100 being of such dimension, that the flange 76 has a snug fit within the second housing 84, attaching the first bearing 72 to the second housing 84, wherein the second bearing 88 is attached to the second housing 84 through the first flange 76 and second set screw 96. To rotate the screen 38 about the x or z axis, the top or bottom of the screen 38 can be pushed or pulled, wherein the screen 38 and attached second bearing 88 rotate relative to the second housing 84. Pushing or pulling the end of the monitor 38, will rotate the second housing 84 and first bearing 72 relative to the first housing 64, rotating the screen 38 about the y-axis as indicated in FIG. 4. After the monitor 38 is retracted and displayed, the telescopic trays 12 can be slid back as shown in FIG. 4, allowing the user to utilize the trays to set down drinks, books, etc. while still viewing the screen 38.

The first 72 and second 88 bearings may have third 102 and fourth 104 bores, respectively, to allow electrical cable 106 access from an external source to the monitor 38. The cable 106 may have a conduit 108 that attaches to the first bearing 72 within a counterbore 110 of the bearing. The combination of the hidden set screws and covered cable provides an aesthetic design devoid of exposed wires or fasteners.

A third 112 and fourth 114 groove with accompanying O-rings 116 inserted, can be added to the first 64 and second 84 housings, respectively. The O-rings provide frictional forces between the housings and the respective bearings, such that when the monitor 38 is rotated the O-rings will "hold" the screen in place. This provides semi-rigid adjustment means for the monitor 38. Thus what is provided is a mechanism that will retract a viewing monitor from a stowing compartment, that allows easy adjustment of the screen and utilization of trays to maximize user comfort.

While certain exemplary embodiments of the invention have been described above and shown in the accompanying drawings, it is to be understood that such embodiments are merely illustrative of, and not restrictive on the broad invention, and that this invention not be limited to the specific constructions or arrangements shown and described, since various other modifications may occur to persons having ordinary skill in the art.

What is claimed is:

1. A display unit that exposes a viewing device stored in a stowing compartment of an armrest having an x, y and z axis, comprising:

sliding means operatively connected to the viewing device for positioning the viewing device along the y-axis of the armrest, such that the viewing device can be stored or retracted from the stowing compartment;

first rotational means operatively connected to the viewing device for rotating the viewing device about the y-axis of the armrest; and second rotational means operatively connected to the viewing device for rotating the viewing device in a plane parallel to the y-axis of the armrest.

2. The display unit as recited in claim 1, wherein said sliding means comprises;
- a track attached to the armrest within the stowing compartment, said track having a first groove extending along the y-axis of said track; and
- a first slide plate operatively connected to the viewing device, said first slide plate being adapted to slide along said first groove of said track, whereby said viewing device can be positioned along the y-axis of the armrest.

3. The display unit as recited in claim 2, further comprising first stop means for securing said first slide plate at a first predetermined position on said track.

4. The display unit as recited in claim 2, further comprising a second slide plate operatively connected to the viewing device, said second slide plate being adapted to slide along a second groove in said first slide plate, whereby said viewing device can be positioned along the y-axis of the armrest.

5. The display unit as recited in claim 4, further comprising second stop means for securing said second slide plate at a second predetermined position on said first slide plate.

6. The display unit as recited in claim 1, wherein said first rotational means comprises;
- a first housing operatively connected to said sliding means, said first housing having a first bore; and
- a first bearing operatively connected to the viewing device and supported by said first housing, said first bearing being adapted to move within said first bore such that the viewing device can be rotated about the y-axis.

7. The display unit as recited in claim 6, wherein said second rotational means comprises;
- a second housing operatively connected to said sliding means, said second housing having a second bore; and
- a second bearing attached to the viewing device and supported by said second housing, said second bearing being adapted to move within said second bore such that the viewing device can be rotated in a plane parallel to the y-axis.

8. A display unit that stores a viewing device in a stowing compartment having an x, y and z axis, comprising:
- a track attached to the armrest within the stowing compartment, said track having a first groove extending along the y-axis of said track;
- a first slide plate adapted to slide along said first groove of said track, said first slide plate having a second groove along the y-axis of said first slide plate;
- a second slide plate adapted to slide along said second groove in said first slide plate;
- a first housing connected to said second slide plate, said first housing having a first bore;
- a first bearing operatively connected to the viewing device and supported by said first housing, said first bearing being adapted to move within said first bore such that the viewing device can be rotated about the y-axis;
- a second housing operatively connected to said first housing, said second housing having a second bore; and
- a second bearing attached to the viewing device and supported by said second housing, said second bearing being adapted to move within said second bore such that the viewing device can be rotated in a plane parallel to the y-axis;
- whereby said movement of said first and second slide plates relative to said first and second grooves, respectively, provides for positioning of the viewing device along the y-axis of the armrest to retract or restore the viewing device from the stowing compartment, and said rotational movement of said first and second bearings relative to said first and second housings, respectively, provides for rotational positioning of the viewing device about the x, y and z axis to further display the viewing device.

9. The display device as recited in claim 8, wherein said second slide plate is attached to said first slide plate by a screw that threads into a nut, said nut is pressed into said first slide plate such that the viewing device can be detached from said first slide plate by applying a predetermined force to the viewing device.

10. The display device as recited in claim 8, further comprising an O-ring operatively connected to said first bearing and said first housing, and an O-ring operatively connected to said second bearing and said second housing, said O-rings apply controlled frictional forces to said bearings such that said bearings and the viewing device do not rotate until a predetermined moment is applied to the viewing device.

11. The display device as recited in claim 8, wherein said first and said second bearings have bores extending through the longitudinal axis therein, said bores providing access for an electrical cable to run from an external source to the viewing device.

* * * * *